No. 819,885. PATENTED MAY 8, 1906.
A. R. HOLMEN.
APPARATUS FOR SOFTENING WATER.
APPLICATION FILED SEPT. 29, 1905.
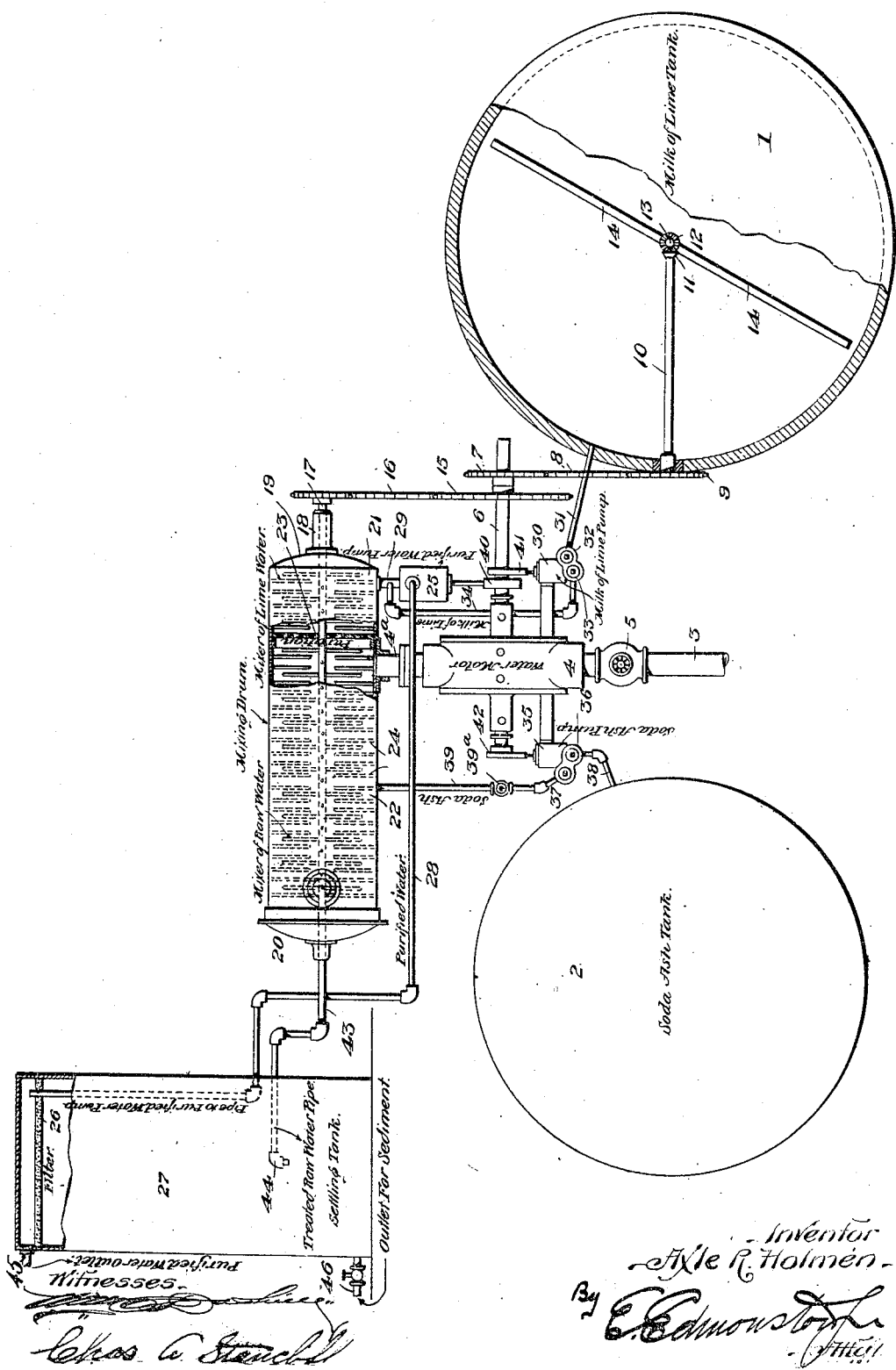
Witnesses
Chas A. Stauch
Inventor
Axle R. Holmen
By E. Edmonston
Atty

UNITED STATES PATENT OFFICE.

AXLE R. HOLMEN, OF COLUMBUS, OHIO.

APPARATUS FOR SOFTENING WATER.

No. 819,885.  Specification of Letters Patent.  Patented May 8, 1906.

Application filed September 29, 1905. Serial No. 280,685.

*To all whom it may concern:*

Be it known that I, AXLE R. HOLMEN, a subject of the King of Sweden and Norway, residing at Columbus, county of Franklin, and State of Ohio, have invented certain new and useful Improvements in Apparatus for Softening Water, of which the following is a specification.

My invention relates to an improvement in apparatus for softening water, and more particularly to that class of apparatus in which the lime in the water is treated chemically to form an insoluble compound which may be removed by precipitation, as by mixing with the raw water a solution of milk of lime and soft water and thoroughly agitating the mixture with the raw water to be treated, then adding a solution of soda-ash to change the sulfate of lime to hydrate of lime, which in turn acts on the bicarbonate of lime in the water, forming a precipitable carbonate of lime.

The object of the invention is the provision of means whereby the raw-water supply governs the amount of chemical solution to be added thereto, so that the proportion of each will be equal to the amount required to soften the water.

A further object of the invention is the novel means for driving the respective parts and the novel means for proportionately mixing the different chemicals with the water to be treated, so that prior to entering the settling-tank the water and chemicals are thoroughly commingled, giving the soda-ash solution opportunity to act on the lime.

Further objects of the invention will be apparent to those versed in the art when the specification is read in connection with the accompanying drawing, which forms a part of this application, and in which the figure shown is a diagrammatic view of my improved apparatus.

Referring more especially to the drawing, 1 represents a suitable tank which is adapted to contain a milk-of-lime solution, and 2 represents a similar tank adapted to contain a supply of soda-ash solution. The solutions in each are first treated analytically to ascertain the requisite strength, and knowing the proportion of raw water supplied and the amount of solutions pumped the strength of the solutions is made to obtain the proper precipitation.

The numeral 3 designates the raw-water-supply pipe, which furnishes the water to be treated to the motor 4 and which is provided with a suitable valve 5, by which the supply may be regulated or cut off. This motor may be of any suitable type which will advantageously perform the work required; but in practice I prefer to use a rotary motor, as with this type I am enabled to govern the amount of water supplied with each rotation of the piston of said motor. The piston of the motor is provided with a central shaft 6, which is journaled in both sides in the casing of said motor and extends to one side thereof for a considerable distance, where at the end it is provided with a sprocket-wheel 7, connected by a sprocket-chain 8 with a similar wheel 9, keyed to a shaft 10, mounted within and extending to the center of the milk-of-lime-solution tank 1, where it is provided with a toothed pinion 11, adapted to mesh with a similar pinion 12, keyed to the vertical shaft 13 of the mixer 14. In juxtaposed relation with the sprocket-wheel 7 is another sprocket-wheel 15, keyed to the shaft 6 and driving, through the sprocket-chain 16, the mixer-shaft 17, which is journaled in bearings 18, mounted on the removable ends 19 of the mixing-drum 20. This mixing-drum is divided into separate compartments 21 and 22 for the mixing of the soft water and the milk of lime and the raw-water and the soda-ash solution, respectively, by a foraminous partition 23, and in each of the compartments 21 and 22 there is secured to the casing inwardly-projecting arms 24, between which are similar arms secured to the shaft 17 and which project radially therefrom.

Mounted upon any suitable support and in proper relationship with the shaft 6 is the soft-water pump 25, which receives its supply of soft water from above the filter 26, located in the upper portion of the settling-tank 27, through the pipe 28 and conveys its discharge to the compartment 21 through the pipe 29. Upon the opposite side of the shaft is located the "milk-of-lime" pump, receiving, through pipe 31 and check-valve 32, the agitated solution from tank 1. From there it is pumped through check-valve 33 into pipe 34, which enters pipe 29 just prior to its entrance into the compartment 21. The check-valves 32 and 33 are provided to prevent the solution from being forced back into the tank 1 and into the pump 30 from the force derived from the pump 25.

On the opposite side of the shaft 6 to that on which is located the sprocket-wheels 7 and 15 and on the other side of the motor 4 in the same relation to the shaft 6 as the pump 30 is a pump 35, similar in every respect to the pump 30 and also provided with check-valves 36 and 37 and an inlet-pipe 38, which runs from the soda-ash tank to the pump. Leading from the check-valve 37 is the discharge-pipe 39, adapted to deliver the soda-ash solution to the mixing-drum 20.

On each side of the motor and keyed to the shaft 6 are eccentrics 40, 41, and 42, connected directly to the piston-rods of the pumps 25, 30, and 35, respectively, so as to drive them one stroke each for each revolution of the motor-shaft.

After the water has been treated in the mixing-drum 20 it is conveyed by pipe 43 to a point near the bottom of the settling-tank 27, where it is provided with a depending L, so that the water is normally forced toward the bottom of the tank, and the tank being of large proportions the water rises slowly to and through the filter 26, thus allowing it ample time for precipitation. Above the filter 26 there is provided an outlet-pipe 45 for the purified water, and at the bottom of the tank there is provided a valved outlet 46, by which the sediment or precipitate may be removed.

The motor 4 is provided with a discharge-pipe 4ª, adapted to deliver the raw water to the mixing-drum at a point adjacent the partition 23.

The operation is as follows: The "soda-ash" and milk-of-lime solution tanks are filled with their respective solutions of the requisite strength and the valve leading to the raw-water motor opened, allowing the water to flow therethrough, thus starting it in motion and causing the shaft 6 to turn, which operates the pumps 25, 30, and 35, the mixing device of the mixing-drum, and the stirring device of the lime-solution tank. Milk of lime now enters the pump 30 and is conveyed through pipe 34 to the intersection of this pipe and pipe 29, where it meets the soft water from pump 25 and is then conveyed to the compartment 21, where it is thoroughly mixed and agitated. Passing on through compartment 21 and through the partition 23 this solution of milk of lime and soft water meets the volume of raw water from the water-motor 4, where the solution acts upon the water to change the soluble bicarbonate of lime in the water to carbonate of lime. After passing for a short distance through the mixer this solution encounters the soda-ash solution from pump 35, which acts upon the water to be softened to change the sulfate of lime into hydrate of lime, which in turn acts upon the bicarbonate of lime in the water, forming an insoluble precipitate, which settles to the bottom of the settling-tank and is there carried off through the outlet 46. The water thus treated rises in the tank, where it is further acted upon by the filter 26, which completes the operation.

I am fully aware of the fact that lime and soda have been used before as precipitating agents; but I do not wish to have my invention limited thereto, as waters having different properties require the use of different precipitating agents, which may be applied in accordance with my invention equally as well.

Having thus described my invention, what I claim as new, and desire to secure by Letters Patent, is—

1. In a water-purifying apparatus, the combination with a closed mixing-chamber having a foraminous dividing member and inwardly-projecting arms, of stirrers rotating between said arms, a water-supply fed to said mixer under pressure, means for regulating the amount of water supplied to said mixer, a motor in said supply, suitable sources of chemical-supply connected to said mixer, and means operated by said motor for supplying the chemicals to said mixer.

2. In a water-purifying apparatus, the combination with a closed mixing-chamber having a foraminous dividing member, and inwardly-projecting arms on each side of said member, of stirrers on a central shaft adapted to play between said arms, a water-supply fed to said mixer under pressure, means for regulating the amount of water supplied to said mixer, suitable sources of chemical-supply connected to said mixer, a motor in said supply and means between the source of chemical-supply and the mixer and driven by the motor for positively and proportionately supplying the chemicals to the mixer.

3. In a water-purifying apparatus, the combination with a closed mixing-chamber having a foraminous dividing member, and inwardly-projecting arms on each side of said member, of stirrers on a central shaft adapted to play between said arms, a water-supply fed to said mixer under pressure, means for regulating the amount of water supplied to said mixer, suitable sources of chemical-supply connected to said mixer, a motor in said supply, means between the source of chemical-supply and the mixer and driven by the motor for positively and proportionately supplying the chemicals to the mixer, a soft-water supply, and means whereby the soft water is proportionately mixed with one of the said chemicals prior to its entrance into the mixer.

In testimony whereof I hereunto affix my signature in presence of two witnesses.

AXLE R. HOLMEN.

Witnesses:
C. E. JUSTICE,
THED. WEYANT.